(12) United States Patent
Rumler

(10) Patent No.: US 6,361,114 B1
(45) Date of Patent: Mar. 26, 2002

(54) SELF-LEVELING CHAIR ARM

(75) Inventor: Thomas C. Rumler, Bristol, IN (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 09/478,747

(22) Filed: Jan. 6, 2000

(51) Int. Cl.7 .............................. A47C 7/54; B60N 2/46
(52) U.S. Cl. ............................. 297/411.39; 297/411.29; 297/411.32; 297/411.38
(58) Field of Search ........................ 297/411.39, 411.25, 297/411.29, 411.32, 411.38, 411.35

(56) References Cited

U.S. PATENT DOCUMENTS

| | | | |
|---|---|---|---|
| 4,311,338 A | | 1/1982 | Moorhouse |
| 4,400,033 A | | 8/1983 | Pietsch |
| 4,707,032 A | * | 11/1987 | Chang .................... 297/411.29 |
| 4,881,778 A | * | 11/1989 | Stephenson et al. ... 297/411.32 X |
| 4,968,095 A | | 11/1990 | Moyer .................... 297/411.39 |
| 4,978,170 A | | 12/1990 | Pelz et al. .............. 297/411.39 |
| 5,056,868 A | * | 10/1991 | Beck ...................... 297/411.29 |
| 5,088,791 A | * | 2/1992 | Conley et al. ...... 297/411.29 X |
| 5,316,373 A | * | 5/1994 | Markel .................. 297/411.32 |
| 5,720,525 A | * | 2/1998 | Rumler .................. 297/411.32 |

* cited by examiner

*Primary Examiner*—Peter M. Cuomo
*Assistant Examiner*—Rodney B. White
(74) *Attorney, Agent, or Firm*—C. R. Kiczek

(57) ABSTRACT

A chair having a self-leveling armrest is disclosed, comprising a seat bottom and a seat back which rotates between a full up position and a full back position. The arm is moveable between an up position and a down position, and is positioned generally parallel with the seat bottom when in the down position. A first link member is pivotably connected to the seat bottom and to a second link member, and the second link member is pivotably connected to the seat back. The arm is pivotable with the seat back, and in the down position the arm moves with the second link member so that the arm remains generally parallel with respect to the seat bottom as the seat back pivots. A pin extends from the arm and is generally parallel with the armrest member. The pin is received by a pin-receiving groove in the second link member.

17 Claims, 6 Drawing Sheets

SELF-LEVELING CHAIR ARM

FIELD OF THE INVENTION

The present invention generally relates to an improved seat or chair, and more particularly to a chair having pivotable arms suitable for use in a motor vehicle.

BACKGROUND OF THE INVENTION

Self-leveling chair arms are considered desirable in some applications for reclining seats. For example, U.S. Pat. No. 4,400,033 to Pietsch discloses a theatre or stadium chair having a seat back and a seat cushion and an arm connected to a seat back with a parallelogram linkage, so that in one position as the seat back pivots the arm stays essentially parallel to the seat cushion.

However, such known self-leveling chair arm designs suffer from complexity and relatively high cost. This makes such designs impractical in many areas including, for example, automotive seats. In particular, seats used in the van conversion industry (which heretofore have not been self-leveling) use an industry standard arm. The arm has a longitudinally extending armrest member having a dowel extending at a generally right angle to the armrest member, and a pin extends at a right angle to the dowel such that the pin is typically generally parallel with the armrest member and often is also coplanar with the armrest member. Examples of the industry standard arm typically used in the van conversion industry can be seen in U.S. Pat. No. 5,720,525, originally assigned to Excel Industries, Inc.; U.S Pat. No. 5,056,868, originally assigned to Global Glass, Inc.; and U.S. Pat. No. 5,316,373, originally assigned to Voyager, Inc.

It would be highly advantageous to provide a chair or seat in which an arm such as those commonly used in the van conversion industry stays at a substantially constant angle with respect to the seat bottom as the seat back pivots when the arm is in a down position.

In view of the foregoing, it is an object of the present invention to provide a chair frame or an assembled chair having a self-leveling chair arm suitable for use in the automotive and van conversion industries, where the arm in a down position stays at generally the same angle with respect to the seat bottom as the seat back pivots. It is an additional object of the present invention to provide a chair having a self-leveling chair arm that is of an elegant and low cost design, and which is easy to assemble. It is yet another related object of the present invention to provide a self-leveling chair arm with reduced vibrational noise and which is highly reliable in operation.

SUMMARY OF THE INVENTION

In accordance with these and other objects, there is provided a chair frame or an assembled chair having a seat bottom and a seat back, with a recliner pivotably connecting them together. A longitudinally extending arm is moveable between and up position and a down position. The arm has an armrest member which extends generally parallel with the seat bottom when in the down position. The arm also has a pin extending generally parallel to the armrest member. A first link member is pivotably connected to the seat bottom and to a second link member. The second link member is pivotably connected to the seat back. The arm is pivotable with the seat back, and in the down position the arm is temporarily secured with the second link member so as to move with the second link member. When the arm is in the down position the armrest member can remain generally parallel with respect to the seat bottom as the seat back pivots. The second link member is pivotable with respect to both the first link member and the arm. The pin in the down position may be received in a pin-receiving groove formed in the second link member. In certain preferred embodiments the pin-receiving groove may be formed in the second link member with a portion having a width which is less than the diameter of the pin so as to form at least an interference fit.

From the foregoing disclosure and the following more detailed description of various preferred embodiments it will be apparent to those skilled in the art that the present invention provides a significant advance in the technology and art of seats and chairs. Particularly significant in this regard is the potential the invention affords for providing a high quality, feature-rich, low cost assembly, which incorporates industry standard components. Additional features and advantages of various preferred embodiments will be better understood in view of the detailed description provided below.

Figure 1:
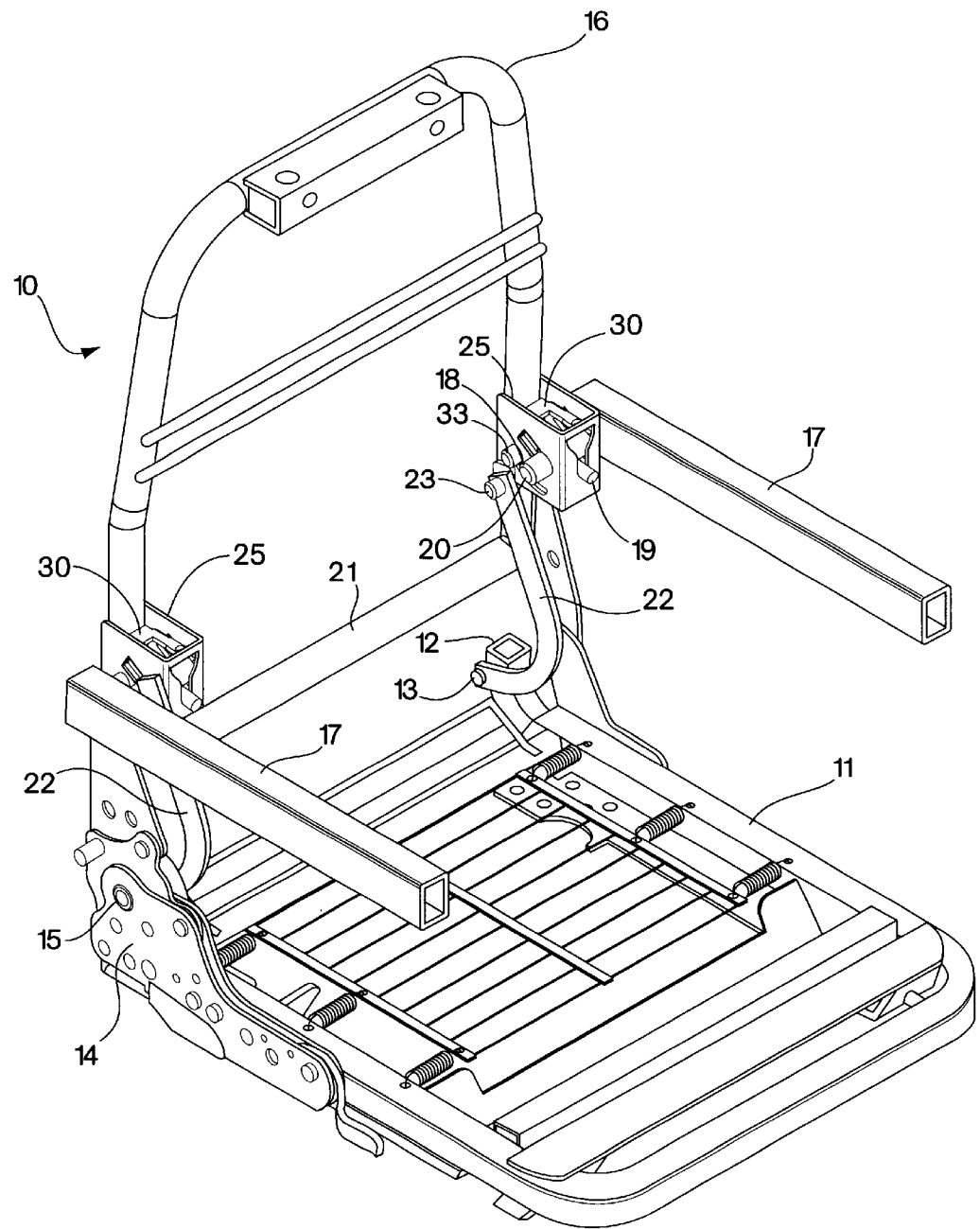
FIG. 1 is a perspective view of a chair frame in accordance with a preferred embodiment, shown with the arms in a down position and the seat back in a full up position.

It should be understood that the appended drawings are not necessarily to scale, presenting a somewhat simplified representation of various preferred features illustrative of the basic principles of the invention. The specific design features of a self-leveling chair arm as disclosed here, including, for example, specific dimensions of the pin and the pin-receiving grooves, will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the chair illustrated in the drawings. In general, up or upward refers to an upward direction in the plane of the paper in FIG. 1, and down or downward refers to a down direction in the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved self-leveling chair arms disclosed here. The following detailed discussion of various alternative and preferred features and embodiments will illustrate the general principles of the invention with reference to a chair or seat for use with a motor vehicle, such as a van conversion seat. Other embodiments suitable for other applications will be apparent to those skilled in the art given the benefit of this disclosure. The term "chair" is used here and in the claims to mean a chair or a chair frame with or without foam, fabric, cushioning and upholstery, etc.

Referring now to the drawings, FIG. 1 shows a perspective view of a chair 10 in accordance with a preferred embodiment. Chair 10 has a seat bottom or base 11 and a seat back 16. The seat back is pivotably connected to the seat bottom by a recliner 14, and the seat back pivots with respect to the seat bottom between a full forward and a full rearward position about a recliner pivot 15. The seat back may have one or more back supports 21. The chair is shown with the seat back in the full forward position in FIGS. 1 and 2.

Seat bottom 11 has right and left side projections 12 to each of which a boomerang link 22 is pivotably mounted at respective bottom boomerang pivots 13. A second end of the boomerang link 22 is pivotably mounted to a respective outer bracket 25 at respective upper boomerang pivot 23. In certain preferred embodiments each outer bracket is a generally C-shaped member, typically formed as a metal stamping and positioned around a corresponding inner bracket 30. Inner brackets 30 are in turn rigidly affixed to the seat back 16. The inner brackets 30 may also be formed as a stamped metal piece. For ease of assembly, preferably each boomerang link 22 is attached to the corresponding outer bracket 25 free of a pin-receiving groove 28, permitting the boomerang link and a respective arm 17 to be readily attached to the outer bracket separate from one another.

Figure 2:
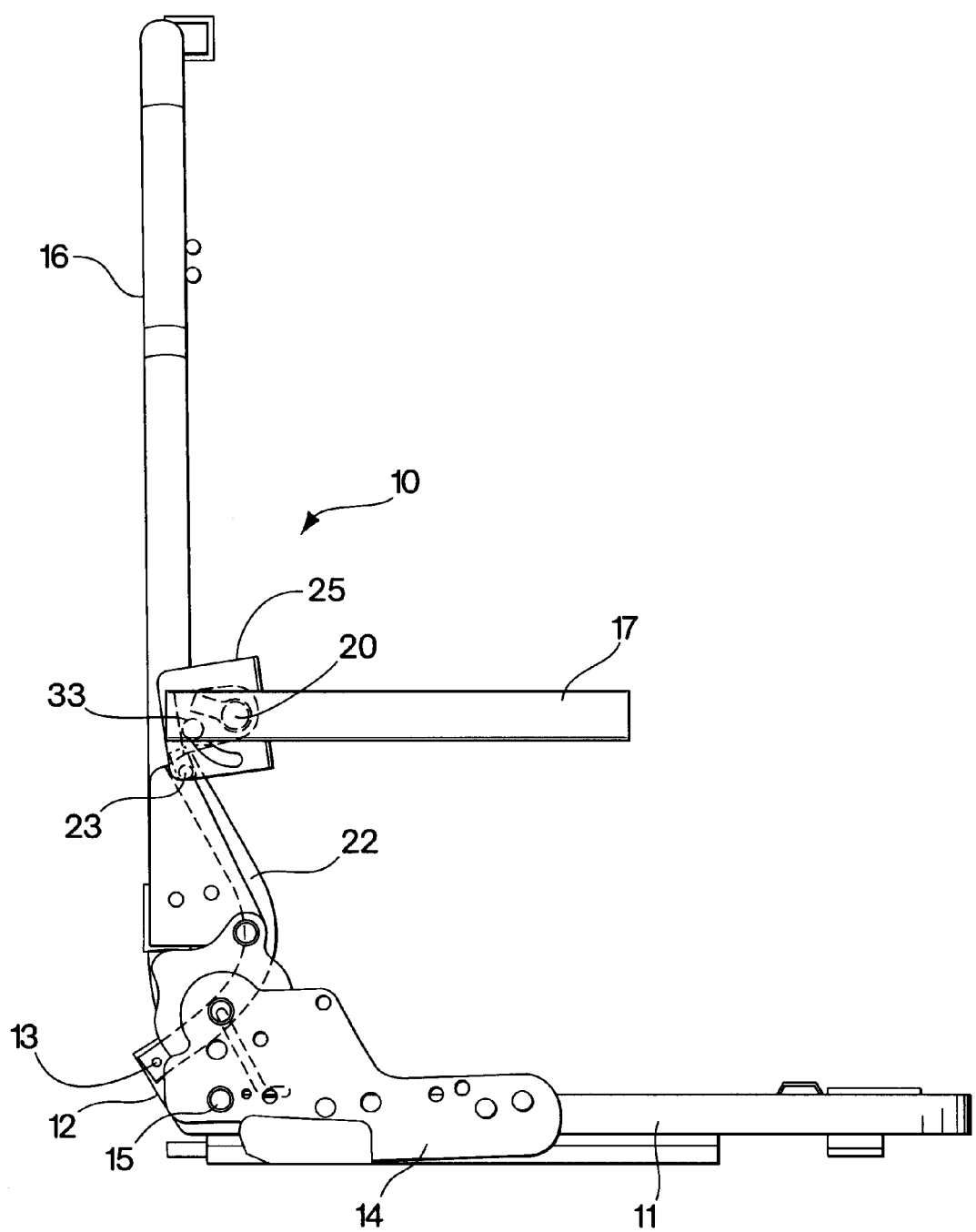
FIG. 2 is a side view of the chair of FIG. 1 with the seat back pivoted to the full up position, showing the arms in a down position and generally parallel with the seat bottom.
Figure 3:
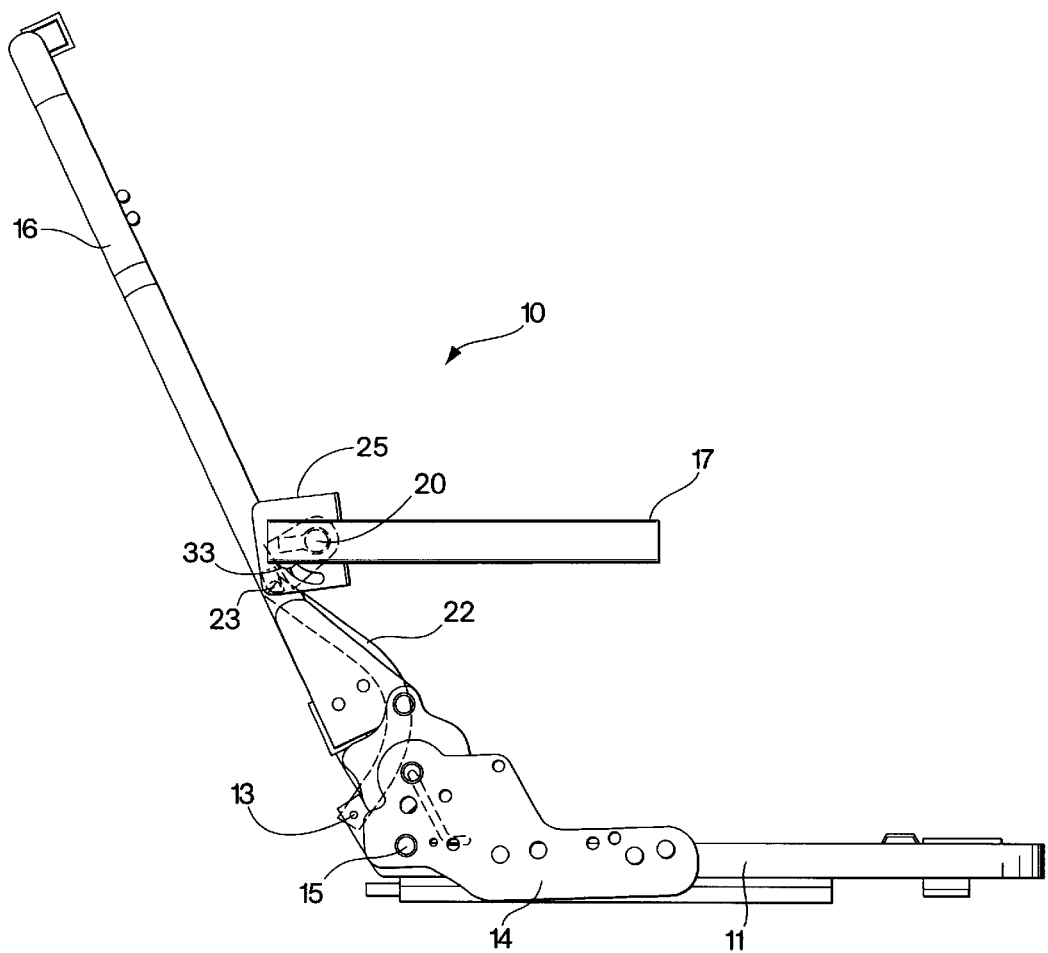
FIG. 3 is a side view of the chair of FIG. 1 with the seat back pivoted rearward where the arms are still generally parallel with the seat bottom.
Figure 4:
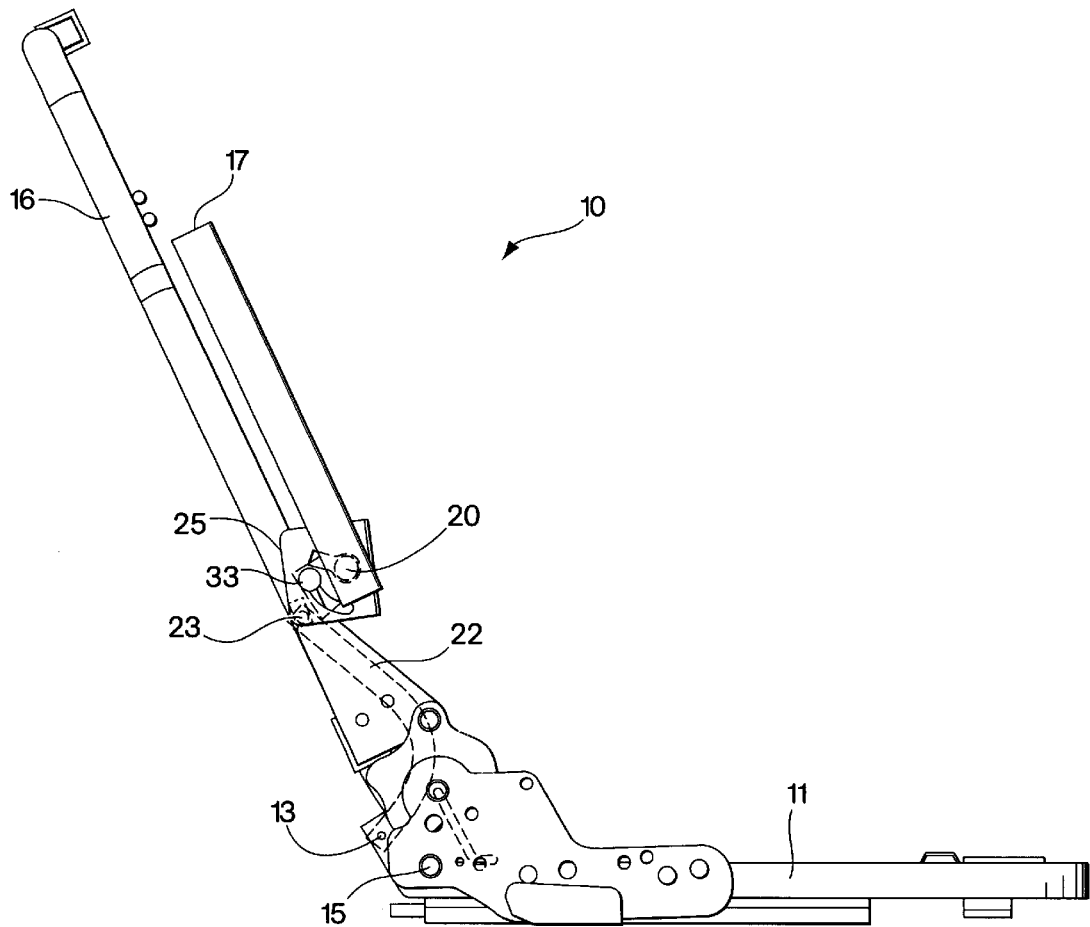
FIG. 4 is a side view of the chair of FIG. 1 with the arms in an up position and the seat back pivoted backwards, showing the arms parallel with the seat back.

The arms 17 are pivotably movable between an up position (shown in FIG. 4) and a down position shown in FIGS. 1–3. Armrest members of the arms pivot about a dowel pivot or top pivot 20 and extend longitudinally from the seat back 16. The outer brackets 25 are not rigidly attached to the seat back. Instead, each outer bracket 25 is free to pivot about the respective dowel 18. Each arm 17 in the down position is releasably engaged to the outer bracket so that the armrest member stays in the same position or orientation relative to the outer bracket as the seat back pivots. By the expression "same position or orientation" it is understood that taumel seat recliners will introduce a minor element of cyclic wobble to the armrest members as to the seat back is pivoted by the taumel recliner. As shown in FIGS. 2 and 3, when the armrest members are in the down position and the seat back is pivoted, the armrest members stay generally parallel to the seat bottom, with the boomerang link 22 pivoting to compensate for the relative movement of the outer bracket with respect to the seat back. As shown in FIG. 4, when the armrest members are moved to the up position the armrest members are free to move with respect to the outer bracket, so when the seat back is pivoted the armrest members can maintain their position or orientation relative to the seat back as they move with the seat back.

Figure 7:
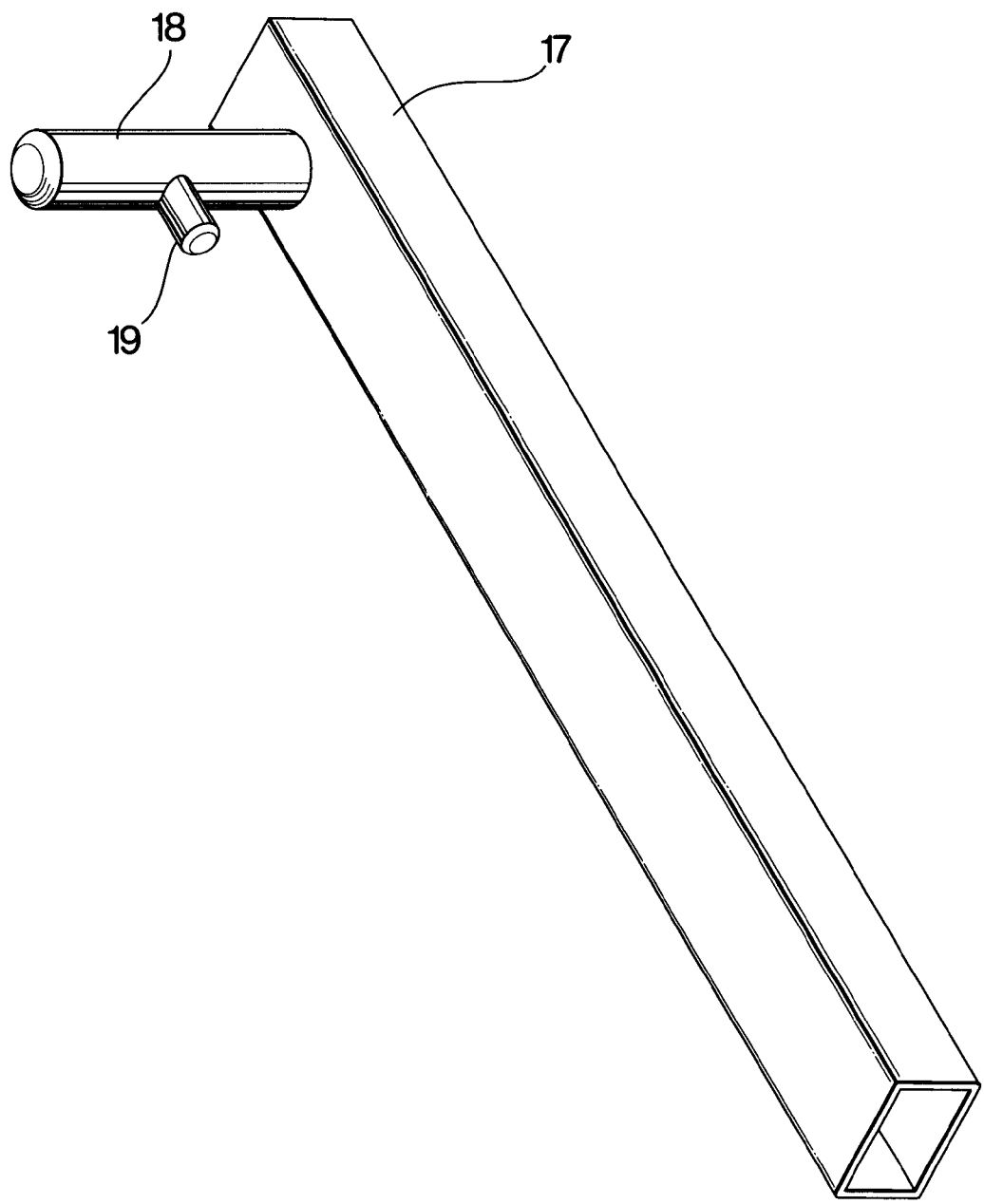
FIG. 7 is an isolated perspective view of the arm of the chair frame of FIGS. 1–4 showing the dowel and pin.

As best seen in FIG. 7, each arm 17 has a dowel 18 extending at a generally right angle from the longitudinally extending armrest member. A pin 19 extends from the dowel 18 at a generally right angle to the dowel, so that the pin is generally parallel with the longitudinally extending armrest member. When the arm is in the down position, the pin 19 is snugly received in the narrow portion 29 of pin-receiving groove 28, releasably holding the pin and therefore the arm.

In accordance with a highly advantageous feature, the distance between the axial lines of pivot 15 and bottom pivot 13 is held generally equal to the axial lines of pivot distance between upper pivot 23 and dowel pivot 20. This ensures that the arms, when in the down position, stay at the same level position with respect to the seat bottom (e.g., generally parallel with the seat bottom) as the seat back pivots with respect to the seat bottom. Moreover, since both the dowel pivot and the upper pivot are constrained by the outer bracket, the axial line of distance between the dowel pivot and the upper pivot stays the same as the seat back pivots.

Figure 5:
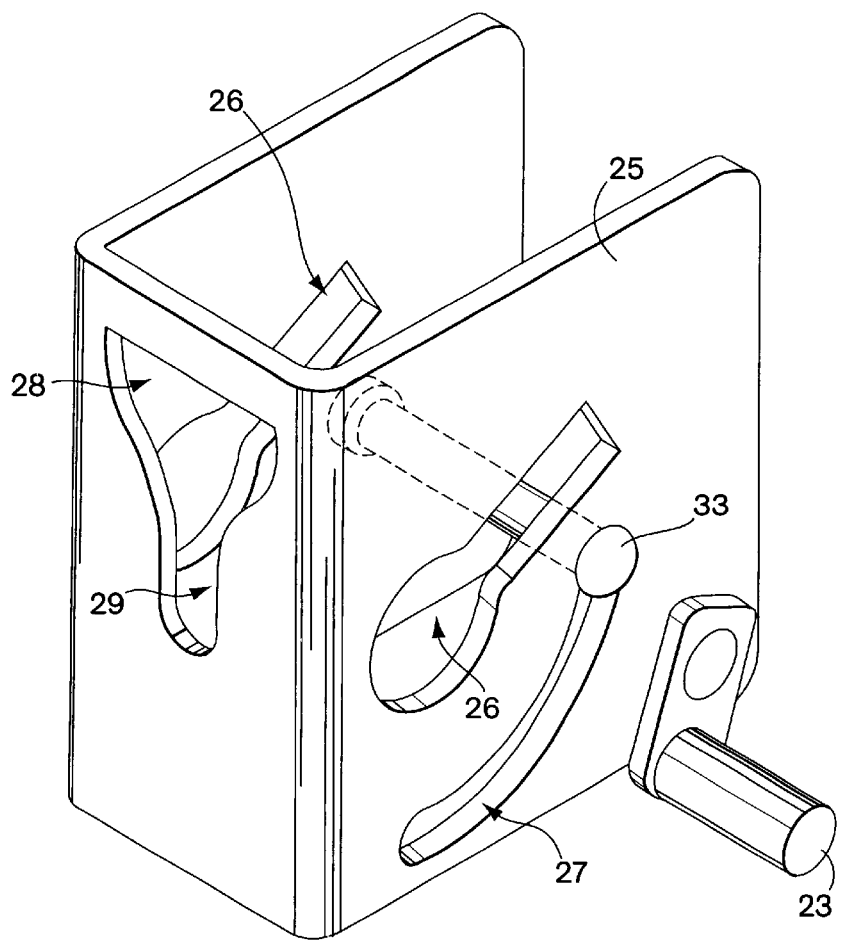
FIG. 5 is an isolated perspective view of the outer bracket of the chair frame of FIGS. 1–4.
Figure 6:
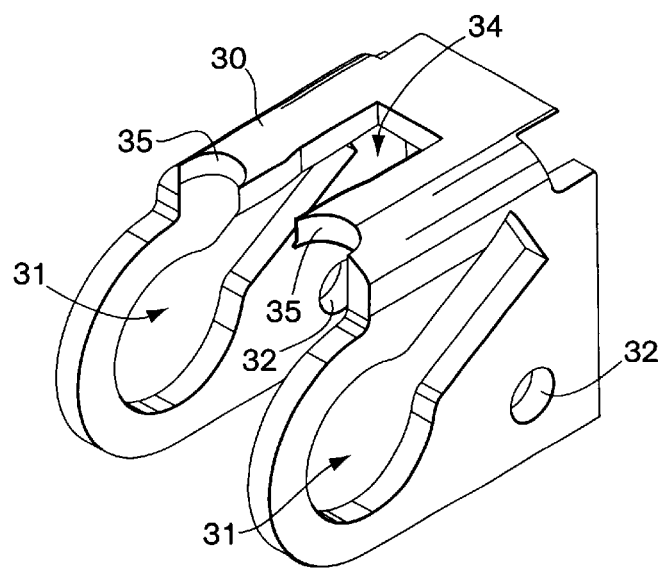
FIG. 6 is an isolated perspective view of the inner bracket of the chair frame of FIGS. 1–4.

One of the outer brackets 25 is shown in isolated perspective view in FIG. 5, and is seen to have a pair of keyholes 26 sized to pivotably receive the dowel 18 and permit the pin 19 to pass through. The arm is inserted through one keyhole 26 when the outer bracket is used for one side of the chair and the arm is inserted through the other keyhole when the outer bracket is used for the other side of the chair. Thus, a common design outer bracket 25 may be used for both left and right arms on a chair. FIG. 6 shows the inner bracket 30, which is typically rigidly affixed to the seat back 16. The inner bracket, like the outer bracket, also has a pair of keyholes 31, sized in a similar manner to the keyholes 26 in the outer bracket 25 so as to be able to receive the dowel and the pin of the arm. When the arm is rotated towards the full up position, the pin 19 moves out of pin-receiving groove 28 of the outer bracket and into central slot 34 of the inner bracket. With cushioning, foam and padding materials (not shown) added to the frame of the chair, the pin may be readily guided to one of two anti-rattle pin-receiving grooves 35. When the pin is engaged in either one of the pin-receiving grooves 35, the arm is in the up position.

Inner bracket 30 also has openings 32 sized to receive guidance bolt 33. The total amount of pivot of the seat back 16 with respect to the seat bottom 11 is controlled by the size of guidance slots 27 formed in outer bracket 25. As the seat back 16 pivots, bolt 33 moves with the inner bracket in hole 32. The bolt 33 travels between a first end and a second end of the guidance slot 27 to define a travel range of the seat back. Other techniques for controlling the amount of travel of the scat back with respect to the scat bottom, such as physical stops behind the seat back or, in the case of power driven seats, a control on the motor, will be readily apparent to those skilled in the art given the benefit of this disclosure.

In accordance with certain preferred embodiments, there is a wedge fit between the pin 19 and the bottom portion 29 of the outer bracket pin-receiving Groove 28, and an interference fit between the pin and the inner bracket anti-rattle pin-receiving groove 35. In accordance with general engineering principles applicable to the design and manufacture of seats or chairs of this type, an interference fit here means that anti-rattle groove 35 has a slot width of up to 0.01% smaller than the diameter of the pin. Likewise, a wedge fit here means an even tighter interference fit which even better accommodates wear due to repeated cycling, that is, raising and lowering of arm 19. In a wedge fit the opening or pin-receiving groove 29 is, relative the pin, smaller than in an interference fit, increasing the interference between the pin and the pin-receiving groove. In a wedge fit the width of the pin-receiving groove is approximately 0.07–0.14 times smaller than the diameter of the pin. The groove 29 is deliberately undersized to account for deflection and wear due to repeated cycling. In one preferred embodiment having a wedge fit, the pin has a diameter of 0.375 inches, and the groove 29 has a width of 0.335 inches. In this manner, as the armrest member is moved so that the pin 19 rotates down into pin-receiving groove 29 or up into anti-rattle pin-receiving groove 35, the pin snugly engages the appropriate groove and rattling and other noises are minimized by the fit between the groove and the pin.

From the foregoing disclosure and detailed description of certain preferred embodiments, it will be apparent that various modifications, additions and other alternative embodiments are possible without departing from the true scope and spirit of the invention. For example, it will be apparent to those skilled in the art, given the benefit of this disclosure, that the boomerang link may have a different curvature, e.g., depending upon the location of the back support 21. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A chair comprising, in combination:
    a seat bottom and a seat back pivotable with respect to the seat bottom about a recliner pivot;
    an arm comprising a longitudinally extending, self-leveling armrest member having a dowel extending from the armrest member and a pin extending from the dowel so as to be generally parallel with the longitudinally extending armrest member, wherein the armrest member is substantially parallel to the seat bottom in a down position, and is pivotable with respect to the seat back to an up position;
    a boomerang link pivotably connected to the seat bottom; and
    an outer bracket having a pin-receiving groove, the outer bracket being pivotable with respect to the seat back, and the outer bracket being pivotably connected to the boomerang link;
        wherein the pin of the arm is releasably engageable with the pin-receiving groove of the outer bracket when the armrest member is in the down position and remains substantially parallel to the seat bottom as the seat back pivots about the recliner pivot.

2. The chair of claim 1 wherein the boomerang link is pivotable about a bottom pivot, the outer bracket is pivotable about an upper pivot, the arm is pivotable about a dowel pivot, and the distance between the recliner pivot and the bottom pivot is substantially equal to the distance between the dowel pivot and the upper pivot.

3. The chair of claim 1 wherein the dowel extends through a keyhole in the outer bracket, and the outer bracket is pivotable with respect to the boomerang link about an upper pivot.

4. The chair of claim 3 further comprising an inner bracket having a keyhole and a hole, wherein an inner bracket is rigidly attached to the seat back and the dowel extends through the inner bracket keyhole, pivotably securing the arm to the seat back.

5. The chair of claim 4 further comprising a guidance bolt, and a guidance slot in the outer bracket having first and second ends, wherein the guidance bolt extends through the hole in the inner bracket and the guidance slot in the outer bracket, pivotably connecting the outer bracket to the inner bracket.

6. The chair of claim 5 wherein the guidance bolt travels in the guidance slot from the first end to the second end to define a travel range of the seat back as the seat back rotates between the full up position and the full down position.

7. The chair of claim 4 wherein the pin extends from the dowel and the pin has a diameter, and at least one pin-receiving groove is formed in the inner bracket having a width which is less than the diameter of the pin, the pin-receiving groove forming at least an interference fit when the pin is received by the pin-receiving groove, temporarily securing the pin to the inner bracket.

8. The chair of claim 3 wherein the outer bracket has a keyhole and an inner bracket has a keyhole and the dowel of the arm is positioned in both keyholes.

9. The chair of claim 3 wherein the pin extends from the dowel and has a diameter, and the outer bracket has a pin-receiving groove, wherein a portion of the pin-receiving groove has a width which is less than the diameter of the pin, forming at least an interference fit between the pin and the outer bracket when the armrest member is in the down position.

10. The chair of claim 9 wherein a wedge fit is formed between the pin and the pin-receiving groove.

11. The chair of claim 1 wherein the boomerang link is attached to the outer bracket free of the pin-receiving groove.

12. A chair comprising, in combination:
    a seat back, a seat back, and a recliner pivotably connecting the seat bottom, permitting the seat back to rotate about a recliner pivot between a full up position and a full back position;
    an arm comprising a longitudinally extending armrest member moveable between an up position and a down position, extending generally parallel with the seat bottom when in the down position, the arm having a pin extending generally parallel to the armrest member; and
    a first link member and a second link member, the first link member pivotably connected to the seat bottom by a pivot extending through the first link member, and pivotally connected to the second link member, and the second link member is pivotably connected to the seat back;
        wherein when the arm is in the down position, the arm moves with the second link member so that the armrest member continues to extend generally parallel with respect to the seat bottom as the seat back pivots between the full up and full back positions.

13. The chair of claim 12 further comprising:
    an inner bracket affixed to the seat back and having an opening;
    a guidance bolt secured to the inner bracket; and
    a guidance slot in the second link member, wherein the bolt extends through the opening and the guidance slot, and the bolt travels in the guidance slot as the seat back pivots.

14. The chair of claim 13 wherein the first link member is pivotably connected to the second link member at a location spaced from the guidance slot.

15. The chair of claim 12 further comprising a recliner pivot which the seat back pivots about, a dowel pivot which the arm pivots about, an upper pivot which the first link member pivots about with respect to the second link member, and a bottom pivot which the first link member pivots about with respect to the seat bottom;

wherein the distance between the recliner pivot and the bottom pivot is generally equivalent to the distance between the dowel pivot and the upper pivot.

16. The chair of claim 12 further comprising an inner bracket affixed to the seat back having an anti-rattle pin-receiving groove with a width less than a diameter of the pin, wherein the second link member and the inner bracket each has a keyhole sized to receive the dowel and the pin, and the arm is pivotable about the dowel so that the pin engages the anti-rattle pin-receiving groove of the inner bracket in at least an interference fit when the armrest member is in the up position.

17. The chair of claim 12 further comprising a recliner pivot which the seat back pivots about, a dowel pivot which the arm pivots about, an upper pivot which the first link member pivots about with respect to the second link member;

wherein the distance between the dowel pivot and the upper pivot stays the same as the seat back moves between the full up and the full back positions.

\* \* \* \* \*